Patented Nov. 14, 1950

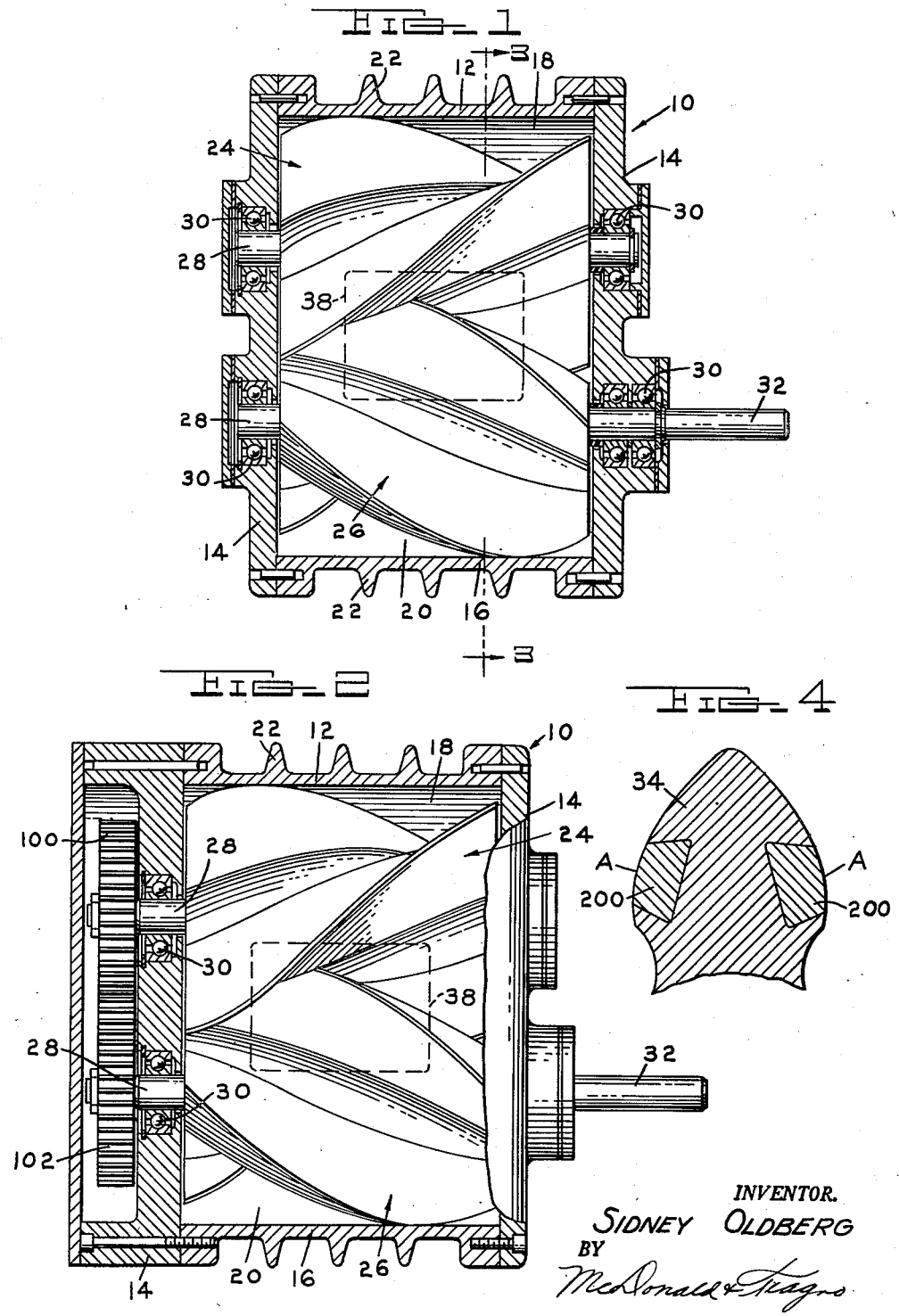

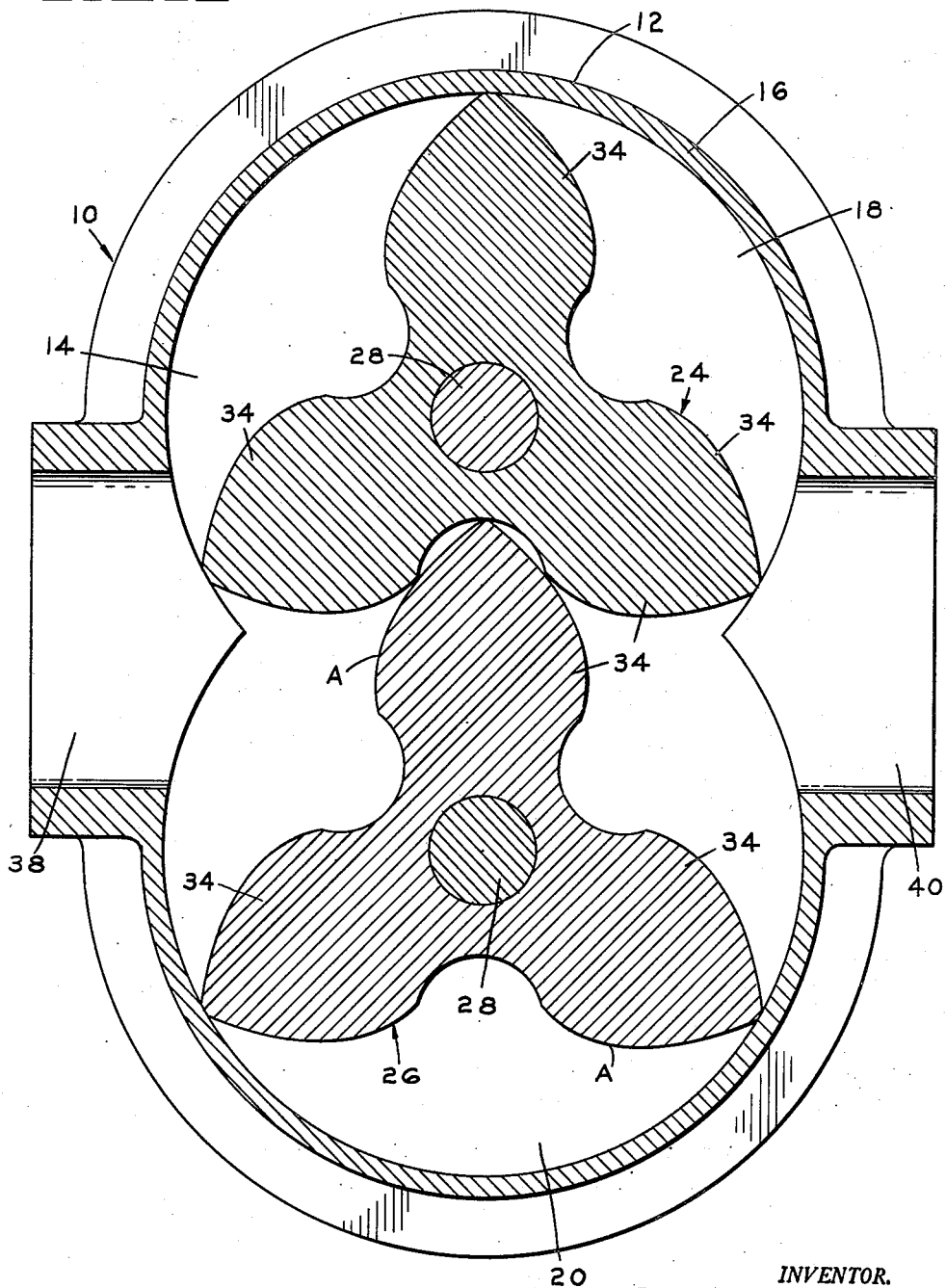

2,530,173

UNITED STATES PATENT OFFICE 2,530,173

HELICAL INTERENGAGING IMPELLERS BLOWER

Sidney Oldberg, Birmingham, Mich., assignor to Eaton Manufacturing Company, Cleveland, Ohio, a corporation of Ohio Application July 25, 1947, Serial No. 763,633

8 Claims. (Cl. 230—143)

This invention relates to rotary air blowers, pumps, or superchargers and more particularly to improvements in structural features thereof.

Broadly the invention comprehends the provision of a positive displacement type supercharger comprising a pair of matching associated rotors each of which has gear teeth in the form of a modified involute, epicycloid or hypocycloid arranged spirally throughout their length such that in the driving relation between the teeth of the respective rotors solely pitch line driving or contact will occur between the teeth therefore effecting a true rolling between the rotor teeth so as to eliminate scuffing.

Although numerous superchargers or air blowers for supercharging fluid for internal combustion engines have been devised in the past, none have proved entirely suitably adaptable for internal combustion engines in the automotive field. The presently devised supercharger in the provision of novel tooth form and rotor construction is believed more economical of construction, quieter and more efficient in operation, and requiring less servicing than superchargers heretofore devised for like use.

An object of the invention is the provision of a supercharger so constructed as to have a constant inlet flow velocity thus avoiding noise.

Another object of the invention is the provision of an air blower comprising a pair of associated rotors having helicoid teeth arranged to have solely pitch line contact thus effecting a true rolling contact and eliminating scuffing.

A further object of the invention is the provision of a supercharger or air blower comprising a pair of associated rotors having a plurality of helicoid gear teeth adapted to mesh with one another along the pitch line of the rotors and being relieved at the addendum and dedendum of the teeth, and having air inlet and discharge ports arranged on opposite radial points of the rotors, said structure providing for constant inlet flow velocity, non-scuffing between the rotor teeth, and prevention of air leakage from the inlet to discharge side thereof.

A yet further object of the invention is the provision of an air blower comprising a pair of helicoid rotors, the tooth profiles of which can be generated by moving the rotor axially under a large diameter end mill while the rotor is rotated, the amount of rotation being determined by the desired helix angle of the tooth.

Other objects and advantages of the invention will appear from the following description taken in connection with the drawings forming a part of the specification, and in which:

Fig. 1 is a partly cross-sectionalized side plan view of a supercharger or air blower construction constituting the invention;

Fig. 2 is a partly cross-sectionalized side plan view of a supercharger similar to Fig. 1 incorporating driving gears therefor;

Fig. 3 is a cross-sectionalized end view of the supercharger shown by Figs. 1 and 2 illustrating the generated rotor tooth profile; and Fig. 4 is a fragmentary cross-sectionalized view of a modified rotor tooth.

The present air blower through the provision of novel structural details and ease in the manufacture thereof affords a practical and economical solution to the adaptation of superchargers to automotive vehicles.

The structure of this blower is comparable to a Root's type blower solely in that it comprises a pair of rotors arranged in a blower housing and having a plurality of associated gear teeth of chosen tooth form. The variations therefrom reside primarily in the provision of rotors having a plurality of gear teeth, said teeth being helicoid or twisted throughout the axial length of the rotor an amount determined by dividing the number of teeth provided in the rotor into substantially 360°. By so forming helicoid gear teeth rotors, the inlet flow velocity is maintained substantially constant resulting in appreciably reducing air inlet noise. The tooth form is preferably that of a modified involute although it might also be a generated epicycloid or hypocycloid. The involute profile is modified from a true involute by relieving the addendum and dedendum, the amount of relief being zero at the pitch line and gradually increasing at the tip and root. By this relief away from the pitch line, it is possible in the providing of a driving relation between the respective rotors having said tooth form to produce solely pitch line contact throughout the length of the rotor teeth thus effecting a true rolling condition between the teeth and thereby eliminating any tendency for scuffing therebetween. The involute is herein preferred to the epicycloid and hypocycloid in that should any slight error occur in the production of the rotor with a tooth form as to the exactness of the pitch line a lesser pressure angle or tendency to scuffing might occur between involute surfaces than the epicycloid or hypocycloid. In view of the helicoid rotors provided, it is possible to place the inlet and outlet ports on opposite sides of the rotors radially of one another and thus prevent leakage of air from the inlet to discharge sides thereof.

For the purpose of minimizing any possibility of scuffing near the pitch line if the addendum and dedendum of the tooth form are not accurately relieved, inserts of anti-scuffing material or metal can be provided along and near the pitch line although in the majority of instances of proper machining tolerances being maintained, this would not be essentially necessary.

The method of manufacture of these rotors can be easily accomplished in view of the fact that if a plane is passed through the rotor parallel to the axis thereof and at a distance from the axis equal to the base circle radius of the rotor, the intersection of the tooth and the plane is a straight line. By taking advantage of this condition it is possible to generate the entire tooth profile by moving the rotor axially under a large diameter end mill, shaper or grinder while the rotor is rotated; the amount of rotation to axial movement being determined by the number of teeth on each rotor and helix angle required. If the cutting tool is provided with cutting edges running perpendicular to the axis in rotation a true involute would be generated, and therefore to produce the modified involute as here desired, said modification can be obtained by sloping the cutting edges a slight degree.

As a modification to the arrangement of providing direct driving relation between the rotor teeth, wherein it would be desired not to maintain close machine tolerances as to the precise location of the pitch line between the rotors external, substantially no back lash driving gears are provided thus entirely eliminating any possibility of scuffing between the associated rotors while at the same time providing an efficient, economical supercharger construction.

Referring to the drawings for more specific details of the invention, 10 represents generally a supercharger or air blower of the type generally adaptable to the supercharging of air for subsequent delivery to the combustion chambers of internal combustion engines or the like comprising a housing or case 12 formed in three parts consisting of a pair of end plate covers 14 and a central housing member 16 intermediately arranged and supported between the end plate covers having a pair of identical intercommunicating chambers 18 and 20 therein and a plurality of cooling ribs 22 on the external periphery thereof.

A pair of identical three lobed gears or rotors 24 and 26 are arranged for meshing engagement with one another respectively in chambers 18 and 20 and are each affixed to appropriate shafts 28 which in turn are each journalled at opposite ends thereof in suitable bearings 30 arranged in the covers 14. The rotor 26 serves as the input or driving rotor adapted to be driven from an external source of power, not shown through input shaft 32 forming an extension of shaft 28 associated with rotor 26.

The rotors 24 and 26 each have three lobes or gear teeth 34, said lobes being extended spirally throughout the length of the rotors to thus form helicoid rotors. The total angle of spiral or twist in the length of the rotors is determined by dividing 360° by the number of lobes and in the case of three lobes as herein specifically illustrated, the twist will be 120°. By so providing this extent of twist the inlet flow velocity may be maintained constant thus avoiding undesirable noise.

The lobes or gears, as shown by Fig. 3, have the profile of a modified involute in that they are modified from a true involute by relieving the addendum and dedendum, the amount of relief being zero at pitch line A and gradually increasing to about .002 or the like at the tip and root. Through the provision of this shape of tooth form and the helicoid nature of the gears solely pitch line contact is produced which theoretically provides point driving contact relation between the rotors which travels at the pitch line contact of the rotors and moves along the sweep or twist of the lobes or gear teeth in the meshing thereof from one end of the rotors to the other. The gear teeth herein could likewise have either an epicycloid or hypocycloid profile, but the involute is preferred because of the smoother and more efficient manner in which the addendum and dedendum can be relieved so as to inhibit contact of the gear teeth at all points but the pitch line. The rotors are each relieved at the root or base of the lobes or gear teeth as designated at 36 so as to permit of the free movement of tips of the gear teeth of the associated rotor therein without bearing relation therebetween the rotors.

By affording pitch line contact only between the lobes of the rotors a true rolling condition is provided thus avoiding any possible scuffing therebetween.

Inlet and discharge ports 38 and 40 are provided in the housing or case 12 arranged oppositely disposed from one another within substantially the same radial zone relative to the rotors thereby preventing leakage of air from the inlet to the discharge side of the supercharger.

It is to be noted in view of the arrangement of chambers 18 and 20, rotors 24 and 26, ports 38 and 40 and working engagement of the extreme tips of the rotors with the walls of the chambers 18 and 20 that a very effective seal is maintained at all times between the inlet and discharge ports of the blower or supercharger.

The rotors 24 and 26 having the helicoid modified involute profile gear teeth can be readily and effectively manufactured because if a plane is passed through the rotor parallel to the center line of the rotor and at a distance equal to the base circle radius of the rotor, the intersection of the tooth and the plane is a straight line. With this known geometry of the rotor teeth it is possible to generate the entire tooth profile by moving the rotor axially under a large diameter end mill or the like while the rotor is rotated, the amount of rotation to axial movement being determined by the helix angle desired. If the end mill has cutting edges which are perpendicular to the axis in rotation, a true involute would be generated, whereas to produce the desired modified involute hereinbefore described, it is necessary to slightly slope the cutting edges.

Fig. 2 illustrates a modification of the structure shown by Fig. 1 in that the shafts 28 of the respective rotors 24 and 26 having fixedly secured thereto meshing gears 100 and 102 which are of substantially no back lash type and are adapted to carry the driving load between the rotors without any actual lobe or gear teeth engaging relation therebetween. It is imperative in the structure of Fig. 2 that like constructed rotors as Fig. 1 be provided so that improved operating characteristics of superchargers of this type be obtained.

The input drive to the rotor 26 is transmitted therethrough to the gear 102 affixed to shaft 28 thereof and thence from gear 102 to gear 100 thereby effecting rotation of rotor 24 in unison with it out of direct meshing relation with rotor 26.

The gearing driving relation 100—102 for operating the rotors 24 and 26 of the supercharger is primarily provided so as to eliminate entirely any possibility of scuffing between the rotors should the manufacture thereof result in other than substantially perfect pitch line machining of the gear teeth and pitch line engagement between the associated gear teeth of the rotors 24 and 26.

Fig. 4 illustrates a modified form of gear tooth from that shown by the other figures in that an anti-scuffing material 200 is embodied in the tooth structure extending throughout the length of the rotors and providing a meshing or bearing surface having a width with the pitch line occupying substantially the medial line thereof. By providing such a tooth form if slight meshing inaccuracies occur in the manufacture or production of the rotors and a perfectly true rolling engagement is not provided therebetween in the operational use thereof, scuffing therebetween is virtually eliminated.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A rotary blower comprising a casing having a chamber therein and inlet and discharge ports communicating with the chamber, a pair of interengaging rotors rotatable in the chamber, each of said rotors having a plurality of teeth or lobes uniformly twisted throughout the length of the rotors and the cross section of the lobes being relieved on the addendum and dedendum from the true pitch line of the rotors so as to provide solely pitch line contact between the rotors in the rotation thereof.

2. A rotary blower comprising a casing having a chamber therein and inlet and discharge ports communicating with the chamber, a pair of intermeshing rotors rotatable in the chamber, each of said rotors being provided with a plurality of lobes twisted through an angle of substantially 360° divided by the number of lobes on each rotor and the lobes in every cross section taken perpendicular through the axis of rotation of each rotor being of a tooth form relieved on the addendum and dedendum from zero relief at the pitch line increasing to a predetermined amount at the tip and root thereof effective in the rotation of the rotors to provide for solely pitch line contact throughout the twisted length of the rotors.

3. A rotary blower comprising a pair of intermeshing rotors and a housing in which the rotors are rotatably mounted having air inlet and discharge ports arranged in the wall thereof radially oppositely disposed from one another in a zone perpendicular to the axes of rotation of the rotors, said rotors each having a plurality of like equispaced lobes or gear teeth of a modified involute configuration relieved on the addendum and dedendum from zero relief at the pitch line adapted to provide for solely pitch line contact relation between the rotors in the operative driving rotation therebetween, and said lobes being spiral throughout the length of the rotors.

4. A rotary blower comprising a blower housing having a pair of intercommunicating chambers and inlet and discharge ports arranged intermediate the chambers and a pair of identical intermeshing rotors mounted for rotation in the housing, each rotor having a plurality of equispaced helicoid lobes and each lobe having a cross sectional shape of a modified involute relieved on its addendum and dedendum from zero relief at the pitch line increasing to a predetermined amount at the root and tip thereof providing for solely pitch line contact between the lobes on the respective rotors in the driving rotation therebetween.

5. A rotary blower comprising a blower housing having a pair of intercommunicating chambers and inlet and discharge ports arranged intermediate the chambers and a pair of identical intermeshing rotors mounted for rotation in the housing, each rotor having a plurality of equispaced helicoid lobes and each lobe having a cross sectional shape of a modified involute relieved on its addendum and dedendum from zero relief at the pitch line providing for solely pitch line contact between the lobes on the respective rotors in the driving rotation therebetween and each lobe having anti-scuffing inserts substantially along the pitch line contacting surfaces thereof.

6. A rotary blower comprising a blower housing, and a pair of drive transmission intermeshing rotors mounted for rotation in the housing, said housing having inlet and discharge openings arranged in the wall thereof oppositely disposed from one another and radially of the rotors, said rotors each having lobes and grooves adapted to intermesh with the lobes and grooves of the other rotor and said lobes each being twisted uniformly throughout the length of the rotors and presenting a cross sectional shape of an involute relieved on the addendum and dedendum starting at zero at the pitch line and increasing to the tip and root so as to provide solely pitch line contact between the rotors and engagement of the tips of the rotor with the interior surface of the housing wall throughout the axial length of the rotors.

7. A rotary blower comprising a blower housing having a pair of intercommunicating chambers, and inlet and discharge ports arranged substantially intermediate the chambers and radially oppositely disposed to one another, a pair of rotors mounted in the blower housing, one rotatable in each of the chambers and having interengaging relation in a zone between the chambers, means external of the chambers for driving one of the rotors and meshing gear means associated respectively with the rotors for rotating the rotors, said rotors having a plurality of lobes twisted uniformly throughout their length through an angle of substantially 360° divided by the number of lobes on each rotor and each lobe having an involute cross sectional shape relieved at the addendum and dedendum thereof with zero relief at the pitch line and increasing in opposite directions along the addendum and dedendum to a predetermined amount at the tip and root thereof.

8. A rotary blower comprising a blower housing having a pair of intercommunicating chambers, and inlet and discharge ports communicating with the chambers intermediate thereof, a pair of rotors mounted in the blower housing, one rotatable in each of the chambers and having interengaging relation in a zone between the chambers common to the inlet and discharge ports, means external of the chambers for driving one of the rotors and meshing gear means connected to the respective rotors for rotating the other of the rotors, said rotors having a plurality of lobes twisted uniformly throughout their length and each lobe having an involute cross-sectional shape relieved in increasing amount along the addendum and dedendum thereof starting with zero relief at the pitch line and terminating in a maximum predetermined amount at the tip and root thereof.

SIDNEY OLDBERG.

REFERENCES CITED

The following references are of record in the file of this patent:

UNITED STATES PATENTS

| Number | Name | Date |
|---|---|---|
| 1,004,776 | Green | Oct. 3, 1911 |
| 1,194,904 | Wagner | Aug. 15, 1916 |
| 1,319,776 | Kerr | Oct. 28, 1919 |
| 2,078,334 | Martocello | Apr. 27, 1937 |
| 2,287,716 | Whitfield | June 23, 1942 |
| 2,382,042 | Etnyre | Aug. 14, 1945 |

FOREIGN PATENTS

| Number | Country | Date |
|---|---|---|
| 75,506 | Germany | June 6, 1894 |